United States Patent [19]

Tanaka et al.

[11] Patent Number: 5,361,968
[45] Date of Patent: Nov. 8, 1994

[54] METHOD OF MANUFACTURING METALLIC PRESS DIE

[75] Inventors: Keizou Tanaka; Noboru Nishikawa, both of Sayama; Tsuyoshi Kawase, Yokohama; Masami Watanabe, Takatsuki, all of Japan

[73] Assignee: Honda Giken Kogyo Kabushiki Kaisha, Tokyo, Japan

[21] Appl. No.: 70,716

[22] Filed: Jun. 1, 1993

[51] Int. Cl.$^5$ .............................................. B23K 31/02
[52] U.S. Cl. ....................................... 228/160; 228/231; 148/517; 148/578; 219/77; 219/137 WM
[58] Field of Search ............... 228/160, 222, 225, 231; 148/517, 577, 578; 219/76.1, 76.11, 77.12, 77, 137 WM

[56] References Cited

U.S. PATENT DOCUMENTS

| | | | |
|---|---|---|---|
| 2,824,818 | 2/1958 | Swenson | 148/517 |
| 3,046,167 | 7/1962 | Waxweiler et al. | 148/517 |
| 3,282,748 | 11/1966 | Martens | 148/517 |
| 3,615,920 | 10/1971 | Talento | 148/517 |
| 3,840,366 | 10/1974 | Hirayama et al. | 75/124 |
| 4,846,904 | 7/1989 | Arai et al. | 148/325 |

Primary Examiner—Samuel M. Heinrich
Attorney, Agent, or Firm—Armstrong, Westerman, Hattori, McLeland & Naughton

[57] ABSTRACT

A metallic press die having an edge portion or high pressure portion for processing a workpiece therewith is made by overlaying a welding material to that portion of a base material for the metallic press die which forms the edge portion or high pressure portion, and then machining an overlaid portion into a predetermined shape of the edge portion or high pressure portion. The welding material has a hardness after welding of HRC 45 or below. After the machining step, the overlaid portion is subjected to a subzero treatment to increase the hardness of the overlaid portion. The welding material contains, as a basic composition thereof, 0.5–1.5% by weight of carbon (C), 0.2–2.0% by weight of silicon (Si), 0.3–6.0% by weight of manganese (Mn), 0.3–10.0% by weight of chromium (Cr), 0.3–10.0% by weight of cobalt (Co), and the remaining parts of iron (Fe) inclusive of unavoidable impurities, and wherein a starting temperature of martensitic transformation is 150 ° C. or below.

3 Claims, 3 Drawing Sheets

METHOD OF MANUFACTURING METALLIC PRESS DIE

BACKGROUND OF THE INVENTION

The present invention relates to a method of manufacturing a metallic press die (punch and/or matrix) having an edge portion or high pressure portion for processing a workpiece therewith.

Among metallic press dies, in the case of a metallic trimming press die for trimming, for example, a plate-like workpiece into a predetermined shape, there is provided in a predetermined position in the metallic trimming press die a trimming blade in the form of an edge portion. This trimming blade must be harder than the remaining portion of the metallic trimming press die out of consideration of durabilities. Therefore, it has been normal practice to first form a predetermined portion of a base material of the metallic trimming press die into the shape of a trimming blade, and then to subject the formed portion to quenching by a heat treatment such as flame hardening, whereby a trimming blade of higher hardness is obtained. However, all materials for the metallic trimming press die are not always suitable for this kind of heat treatment and therefore there used to be possibilities that a desired hardness is not obtained even after heat treatment such as flame hardening or the like, or that quench cracks occur. As a solution, the following method is being employed. Namely, that portion of the base material for the metallic press die in which the trimming blade is formed is removed and a welding material for hard facing such as is specified in the Japanese Industrial Standards (JIS) Z3251 or the like is overlaid or clad by welding. Thereafter the portion thus overlaid is machined into a shape of a trimming blade to thereby form a trimming blade.

In the above-described method of overlaying the welding material for hard facing, the composition of the welding material is adjusted so as to obtain a desired hardness even without heat treatment after the overlaying welding. Therefore, it is difficult to perform machining, especially such as is accompanied by intermittent cutting work like milling, after the overlaying welding. It has therefore a disadvantage in that the machining work must include grinding work, with the result that the working steps increase. In other words, the material that can be subjected to intermittent cutting work is limited to material hardness of up to HRC (Rockwell C hardness) 45. The hardness after welding of the above-described welding material becomes HRC 50 or more; it must therefore be resorted to grinding work.

It may be possible to once anneal the overlaid portion to thereby decrease the hardness for machining purpose and thereafter to restore it, after the machining work, to a predetermined hardness by quench. This method, however, not only increases the heat-treating steps but also has a possibility of distorting a base material for metallic pressing die due to heat treatment. As a consequence, after the quench hardening another machining for correction such as grinding or the like must be performed, with the result that the machining steps cannot be reduced.

Furthermore, in case where the base material for the metallic pressing die is cast iron, the material is subjected to the influence of carbon which is contained therein in a large quantity. The hardness of the overlaid deposited metal therefore increases and the toughness decreases with consequent occurrence of cracks. In order to cope with such a problem, an underlaying of nickel, iron-nickel or the like is applied in the first layer to avoid the occurrence of cracks. However, because of the decrease in hardness of the deposited metal due to nickel, multi-layer overlaying becomes necessary.

The above-described problem also arises when an edge portion of a punch in a bend metallic press die is formed by the above-described overlaying welding method or when a high pressure portion of the die such as a bead portion of a die face or a shoulder portion of a punch of a draw metallic press die, is formed by the overlaying welding method.

Therefore, the present invention has an object of providing a method of manufacturing a metallic press die in which the machining after the overlaying welding die is easy in forming in the metallic press die an edge portion or high pressure portion of the die for processing a workpiece therewith and in which, without the necessity of corrective machining, the edge portion or high pressure portion having a hardness above a predetermined value can be obtained.

According to the present invention, the foregoing and other objects are attained by a method of manufacturing a metallic press die having an edge portion or high pressure portion for processing a workpiece therewith, the method comprising the steps of overlaying a welding material to that portion of a base material for the metallic press die which forms the edge portion or high pressure portion, the welding material having a hardness after welding of HRC 45 or below; machining an overlaid portion formed by the preceding step into a predetermined shape of the edge portion or high pressure portion; and subjecting, after the machining step, the overlaid portion to a sub-zero treatment to increase a hardness of the overlaid portion.

As the welding material, there can be used a material which contains, as a basic composition thereof, 0.5–1.5% by weight of carbon (C), 0.2–2.0% by weight of silicon (Si), 0.3–6.0% by weight of manganese (Mn), 0.3–10.0% by weight of chromium (Cr), 0.3–10.0% by weight of cobalt (Co), and the remaining parts of iron (Fe) inclusive of unavoidable impurities, and a starting temperature of martensitic transformation of which is 150° C. or below, or a material which contains, aside from the above-described basic composition, one or more of vanadium (V), nickel (N), molybdenum (Mo), tungsten (W), aluminum (Al) and copper (Cu). The welding material may be used in any of the forms of a coated or covered electrode for arc welding, welding wire and welding powder.

In the foregoing cases, the starting temperature of martensitic transformation (hereinbelow referred to as "Ms temperature") is defined to be the value calculated by the following formula, in which the value of each element is represented in % by weight.

$$Ms\ (°C.) = 550 - 350 \times C - 40 \times Mn - 35 \times V - 20 \times Cr - 17 \times Ni - 10 \times Mo - 5 \times W + 15 \times Co + 30 \times Al - 10 \times Cu$$

The finishing temperature of martensitic transformation (hereinbelow referred to as "Mf temperature") is defined to be the value calculated by the following formula.

$$Mf(°C.) = Ms - 230$$

The reason for having set or defined the composition of the welding material to the above-described ranges is as follows. Namely, as regards carbon, since it is a most effective element in lowering the Ms temperature, larger quantities of other elements which lower the Ms temperature must be added if the carbon content is less than 0.5%, resulting in bad economy. If the carbon content exceeds 1.5%, on the other hand, the Ms temperature will become too low, with the result that other elements cannot be added any more. This brings about a problem in that the characteristics of toughness or the like are lowered. Further, as regards silicon, although it is an element which improves both the deoxidation effect and the flowability of welding material during welding, the effect cannot be attained if the content is less than 0.2% and, if the content exceeds 2.0%, on the contrary, the flowability during welding becomes so good that it becomes difficult to effect overlaying or to attain sufficient layers of cladding. As regards manganese, it is superior in deoxidation effect and in an effect of improving the toughness and is also superior next to carbon in lowering the Ms temperature. However, there will occur blow holes due to insufficient deoxidation if its content is less than 0.3% and if its content exceeds 6.0%, on the other hand, scales will be generated in so much quantity as to impair the workability. As regards cobalt, it has effects of retarding the precipitation of carbides and of decreasing the hardness after the overlaying welding. However, if its content is less than 0.3% the above-described effects cannot be obtained and, on the contrary, if its content exceeds 100% the Ms temperature increases too much and, in view of the fact that cobalt is an expensive element, the cost becomes too high. As regards chromium, it has a strong affinity with carbon so as to become a carbide of high hardness and therefore improves the abrasion resistance of the overlaid portion. However, if its content is less than 0.3%, such effects cannot be obtained and if its content exceeds 10.0%, on the other hand, the hardness becomes so high that the anti-cracking characteristics and toughness are impaired.

Aside from the above-described elements, other elements may be contained within such a limit as to keep the Ms temperature as calculated by the above-described formula at 150° C. or below. As regards the elements such as Ti and Zr, though they have no direct relationship with the Ms temperature and the Mf temperature, they have effects of improving the deoxidation and workability or the like. Therefore, it is also acceptable to add these elements. Further, as regards impurities, aside from those elements which are absolutely necessary in making an alloy of this welding material, the presence of impurities will give rise to no particular problem as long as the Ms temperature is kept at 150° C. or below.

When overlaying is performed on a cast iron base material or unworked material for metallic press die using the above welding material, the Ms temperature in the first and the second layers, in case of three-layer overlaying, will become the normal temperature or below due to the inclusion of carbon in the base material of the metallic press die. As a result, the structure of the deposited metal will mostly become untransformed austenite. Therefore, the hardness of the deposited metal is low to form a metal of relatively soft and tough, with the result that the machining thereof can be easily performed. In the third layer which is overlaid with the same welding material, martensitic transformation is not completed because the Ms temperature becomes 150° C. or below due to the above-described particular composition of the welding material. The hardness as welded therefore becomes HRC 45 or below and the deposited material can also be easily machined. After the above-described overlaid portion has been machined, the overlaid portion is supercooled down to 0° C. or below, in other words, is subjected to a sub-zero treatment using Dry Ice, liquefied nitrogen, freezer or the like. In such a treatment, martensitic transformation of the deposited metal begins to start and residual or persisting austenite is transformed into martensite. As a result, the hardness increases to HRC 45 or more and a deposited metal having a high resistance to abrasion can be obtained. Further, since the hardness is thus increased by supercooling, there will be no such problem, which is likely to happen with the conventional quench hardening, that the metal is oxidized or that a distortion is generated accompanied by the heat treatment of heating to an elevated temperature and cooling; no particular finishing process or the like is either required. Furthermore, even in case where the base material for the metallic press die is cast iron, there will be no such thing that the hardness of the overlaid portion is increased and the toughness decreased with consequent cracks under the influence of carbon which is contained in a large quantity in cast iron. Therefore, unlike the conventional method, there is no necessity of applying an underlaying of nickel, iron-nickel or the like to the first layer, and the working steps can thus be largely reduced.

BRIEF DESCRIPTION OF THE DRAWINGS

The above and other objects and the attendant advantages of the present invention will become readily apparent by reference to the following detailed description when considered in conjunction with the accompanied drawings wherein.

DETAILED DESCRIPTION OF A PREFERRED EMBODIMENT

Figure 1A:
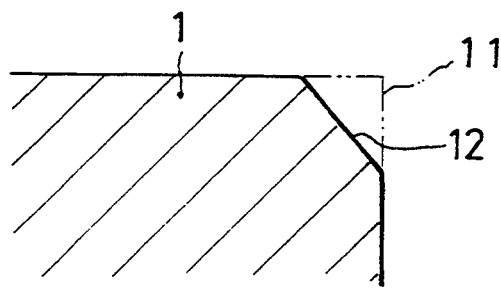
FIG. 1(a) through FIG. 1(d) are diagrams showing one example of working procedures according to the present invention.
Figure 1B:
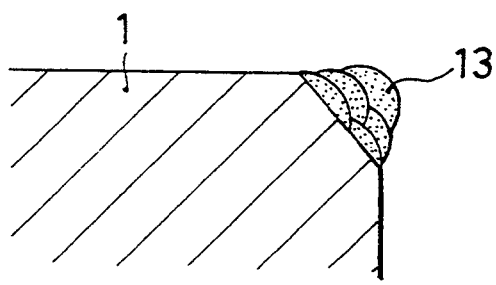
Figure 1C:
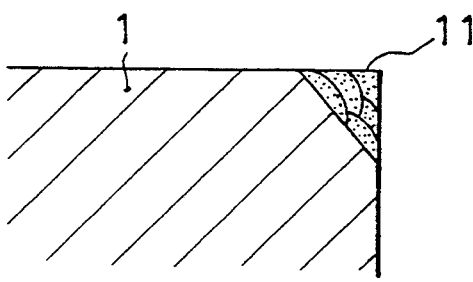
Figure 1D:
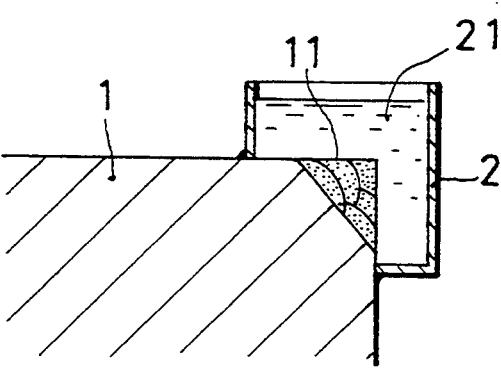

Referring to FIG. 1, numeral 1 denotes a trimming metallic press die for performing a trimming work therewith. An explanation will now be made about an example in which a trimming blade 11 is formed on an edge portion of the trimming metallic press die 1. First, a base or unworked material for the trimming metallic press die 1 is prepared by casting. Then, that portion of the base material in which the trimming blade 11 is to be provided or formed is removed to form a chamfered portion 12. Thereafter, the chamfered portion 12 is overlaid or clad-welded with a welding material in three layers as shown in FIG. 1(b). If the starting temperature of martensitic transformation (Ms temperature) of the welding material is 150° C. or below, austenite within the structure of the overlaid portion 13 after welding will mostly remain or persist as it is without transformation to martensite. It has therefore a hardness which is lower than HRC (Rockwell C hardness) 45 and can be subjected to machining. The trimming blade 11 does not have a sufficient hardness yet in a condition in which, as shown in FIG. 1(c), the overlaid portion has only been machined to the shape of the trimming blade 11. Therefore, as shown in FIG. 1(d), the trimming blade 11 is enclosed by a frame 2 and the frame is filled with a coolant or refrigerant 21 such as Dry Ice, liquefied nitrogen or the like to thereby suprecool the portion to 0° C. or below. A sub-zero treatment to transform the residual or persisting austenite to martensite is thus performed to make the hardness of the trimming blade 11 to more than HRC 45.

Table 1 given hereinbelow shows compositions of a coated electrode for arc welding with a varying percentage of each element. In Table 2 there are given results of investigation of Ms temperature and the finishing temperature of martensitic transformation (Mf temperature) of deposited metals of the first layer, the second layer and the third layer respectively of a three-layer overlaying which was made on an ordinary cast iron (gray cast iron, FC25 according to JIS) using the coated electrode of Table 1. Table 3 shows the results of investigation of such items of the above-described coated electrode as welding workability considering blow holes, presence or absence of cracks, ease with which machining can be performed, hardness of deposited metal as welded, hardness of deposited metal after supercooling treatment and abrasion wear after hardening. Samples Nos. 1 through 19 were subjected to supercooling treatment at −76° C. (Dry Ice) and samples Nos. 20 through 26 were subjected to supercooling treatment at −196° C. (liquefied nitrogen). The hardness and abrasion wear of samples Nos. 20 through 26 when they were supercooled at −76° C. are also shown in parentheses.

Figure 2:
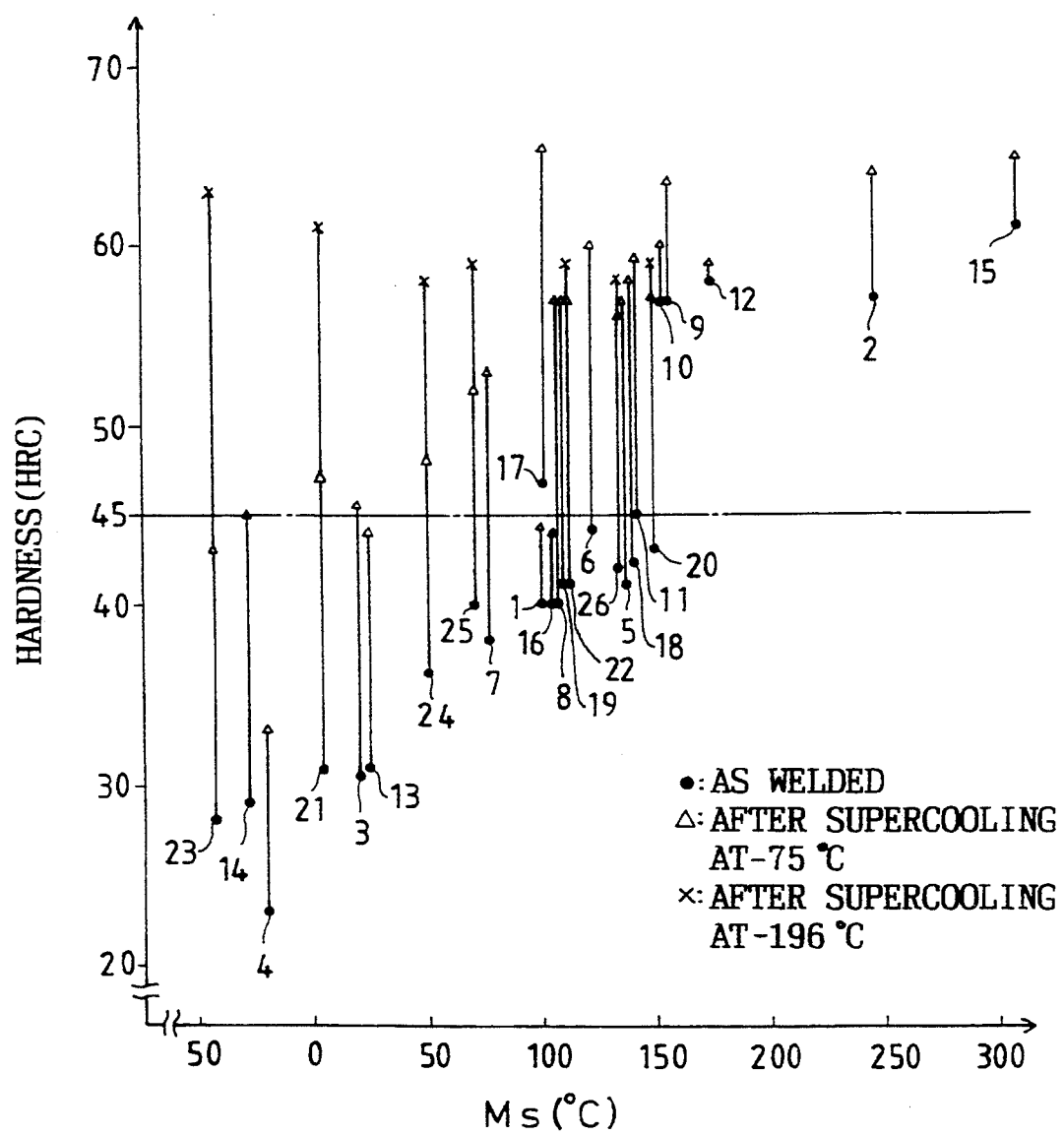
FIG. 2 is a graph showing the relationship between the Ms temperature of an overlaying material and hardness.

After obtaining the Ms temperature by the above-described formula, the relationship between this Ms temperature and the hardness of the deposited metal as welded and the hardness of the deposited metal after supercooling are shown in FIG. 2.

Figure 3:
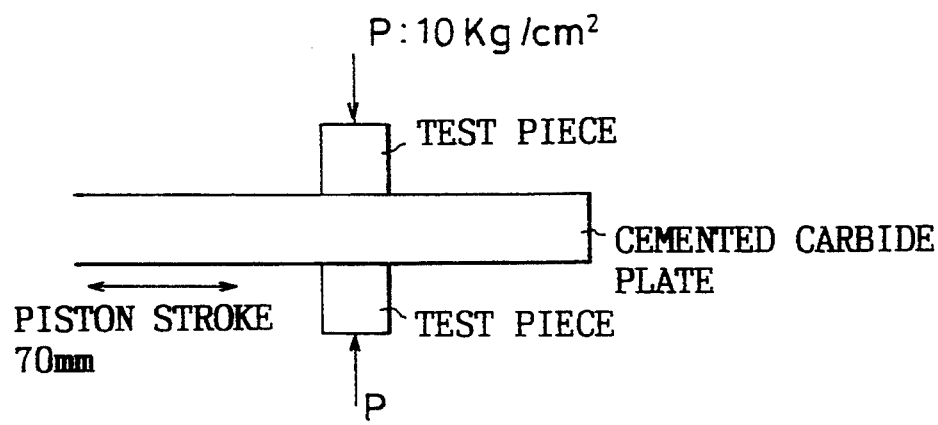
FIG. 3 is a diagram explaining the method of abrasion testing.

As regards the abrasion wear, as shown in FIG. 3, two pieces of test pieces were arranged to pinch or pressingly hold an extraordinary hard plate (cemented carbide plate) at a pressure of 10 kg/cm$^2$. The difference in weight thereof before and after the test of 50000 times of sliding at a speed of 20 reciprocations per minute was measured.

From the above-described test results, the following can be seen. Namely, when the Ms temperature becomes higher than 150° C., the hardness of the deposited metal also becomes higher than HRC 45 (Nos. 2, 9, 10, 12, 15). In the supercooling treatment with Dry Ice, while the hardness cannot sufficiently be increased if the Ms temperature becomes less than 0° C. (Nos. 4, 14), the hardness can sufficiently be increased if the supercooling treatment is performed with liquefied nitrogen (No. 23). Consequently, it has been found that, if the Ms temperature is 150 ° C. or below and if the composition of the deposited metal falls within the above-described range of the present invention, the hardness of HRC 45 or below as welded and the hardness of above HRC 45 after supercooling treatment can be obtained (Nos. 5, 7, 11, 18 through 26). Samples Nos. 18 and 19 are coated electrodes for arc welding which had added thereto other elements to adjust the Ms temperature and the Mf temperature or in which Cr and Mn were partially replaced by those other element(s). It can be seen that they revealed similar results of hardness and abrasion resistance.

Table 4 shows the composition of welding material of 1.2 mm wire (No. 27) and powder of 60-200 meshes (No. 28), both having substantially the same composition as that of No. 5 shown in the above-described Table 1.

Table 5 shows the results of measurements of the Ms temperatures and the Mf temperatures of the first layer, the second layer and the third layer, respectively, of the deposited metal after MIG welding and powder plasma welding were done on gray cast iron (FC25 according to JIS) with the above-described wire and the powder. Table 6 further shows the results of tests of hardness of the deposited metal as welded and hardness of the deposited metal after supercooling treatment with Dry Ice, as well as abrasion wear, welding workability, presence or absence of cracks and ease with which machining can be done.

As can be seen from the above, in the MIG welding and powder plasma welding using the wire and the powder, respectively, though the first layer and the second layer have hardnesses which are slightly different from those in the coated electrode arc welding using the above-described electrode due to a difference in penetration, the same results as in the coated electrode arc welding can be obtained as long as the Ms temperature of the third layer is 150° C. or below, regardless of the method of welding.

Another comparison was made in the following manner. Namely, three-layer overlaying or cladding welding was done on gray cast iron (FC25 according to JIS) by manual welding using the coated electrode which has the composition of No. 5 in Table 1. A four-layer overlaying welding was also done by a conventional method, and a comparison was made between the former case and the latter case.

The welding conditions of the above cases are as follows.

| (Welding Conditins with the Welding material (No. 5) According to the Present Invention) | |
|---|---|
| Electrode diameter | 3.2 mm |
| Welding current | 70–80 Amp |
| Preheating and postheating | None |
| Welding speed | 8–10 cm/min |

(Welding Conditions of the Conventional Method)
Composition of Coated Electrode for Arc Welding for the First Layer (% by weight)
(JIS Z3252 DFCNiFe)

| C | Si | Mn | P | S | Ni | Fe |
|---|---|---|---|---|---|---|
| 0.92 | 0.48 | 0.32 | 0.011 | 0.010 | 56.25 | Remaining |
| Electrode diameter | | | | | 3.2 mm | |
| Welding current | | | | | 120 Amp | |
| Preheating and postheating | | | | | None | |
| Welding speed | | | | | 10 cm/min | |

Composition of Coated Electrode for Arc Welding for the Second-Fourth Layers (% by weight)
(Electrode for hard facing welding)

| C | Si | Mn | P | S | Ni | Fe |
|---|---|---|---|---|---|---|
| 0.92 | 0.48 | 0.32 | 0.011 | 0.010 | 56.25 | Remaining |
| Electrode diameter | | | | | 3.2 mm | |
| Welding current | | | | | 120 Amp | |
| Preheating and postheating | | | | | None | |
| Welding speed | | | | | 10 cm/min | |

Figure 4:
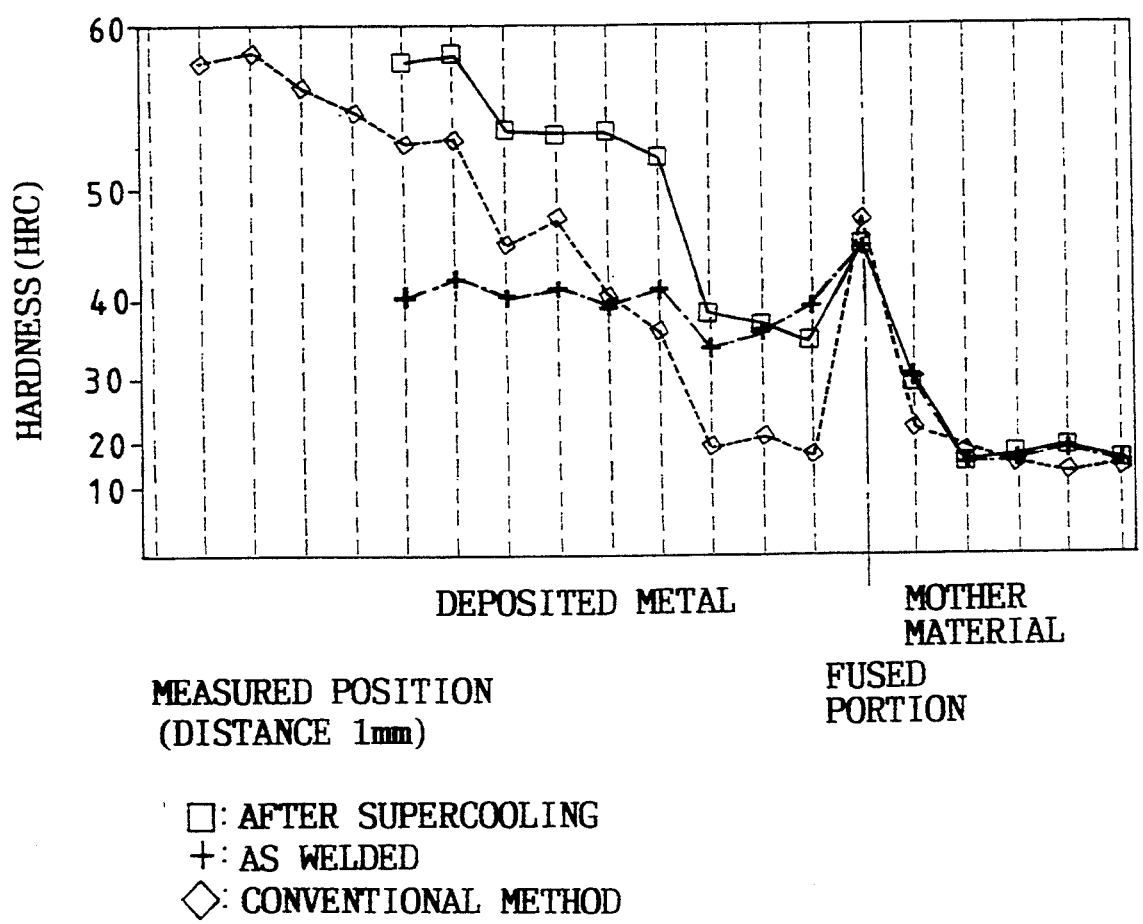
FIG. 4 is a graph showing a hardness of an overlaid portion in the transverse direction.

Sectional hardnesses (or hardnesses measured across a transverse direction) of the deposited metal as welded of the electrode according to the present invention and the conventional electrode as well as the sectional hardness of the deposited metal after supercooling treatment with Dry Ice were measured and their results are shown in FIG. 4. Further, workability was tested by cutting the overlaid portion as welded, and three components of forces in the form of thrust force, feed force and normal force as well as bending force were measured. The results are shown in Table 7.

As can be seen from the above results, when the overlaying welding was done on the base material for a press die of cast iron using the overlaying material according to the present invention, the hardness of the deposited metal as welded is lower than that according to the conventional method. Therefore, the cutting work after welding is easy, and the cutting resistance can be reduced by about 25% compared with the conventional method. The cutting speed can therefore be increased. Further, since there will occur no damages to the cutting blade, the cost for the cutting blade can be reduced. Further, since the cutting blade needs not be replaced, automatic cutting work with an NC milling machine or the like becomes possible. Still furthermore, since there will occur no such things as an increase in hardness of the deposited metal and a decrease in toughness with resultant cracking under the influence of carbon which is contained in the base material for the metallic press die, it is not necessary to underlay with nickel, iron-nickel or the like which was the case with the conventional method. It follows that multi-layer overlaying to prevent the deposited metal from lowering in hardness due to nickel also becomes needless.

It is readily apparent that the above-described method of manufacturing a metallic press die meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

TABLE 1

| No. | C | Si | Mn | Cr | Co | Mo | V | Cal'd Ms temp. (°C.) |
|---|---|---|---|---|---|---|---|---|
| 1 | 0.45 | 0.80 | 5.73 | 3.81 | 0.88 | | | 100.3 |
| 2 | 0.47 | 0.80 | 2.60 | 2.47 | 0.92 | | | 245.9 |
| 3 | 1.60 | 0.70 | 1.15 | 2.28 | 8.22 | | | 21.7 |
| 4 | 1.55 | 0.68 | 0.78 | 7.21 | 9.88 | | | −19.7 |
| 5 | 0.91 | 1.20 | 1.20 | 4.98 | 3.47 | | | 135.95 |
| 6 | 1.05 | 0.10 | 1.13 | 4.21 | 4.59 | | | 121.95 |
| 7 | 1.10 | 0.80 | 1.53 | 4.97 | 4.90 | | | 77.9 |
| 8 | 0.95 | 2.20 | 2.18 | 4.55 | 4.53 | | | 107.25 |
| 9 | 0.85 | 1.00 | 0.93 | 4.96 | 3.42 | | | 167.4 |
| 10 | 0.80 | 0.80 | 6.04 | 0.52 | 9.89 | | | 166.35 |
| 11 | 0.90 | 0.81 | 1.23 | 4.98 | 3.52 | | | 139 |
| 12 | 1.21 | 0.65 | 1.30 | 0.32 | 6.81 | | | 170.25 |
| 13 | 1.10 | 0.82 | 1.56 | 11.23 | 9.85 | | | 25.75 |
| 14 | 0.85 | 0.71 | 4.56 | 4.98 | 0.20 | | | −26.5 |
| 15 | 0.30 | 1.50 | 5.23 | 4.80 | 11.20 | | | 307.8 |
| 16 | 0.90 | 1.08 | 4.31 | | 2.81 | | | 104.7 |
| 17 | 0.90 | 1.21 | 1.01 | 12.05 | 9.91 | | | 102.25 |
| 18 | 0.95 | 0.81 | 1.88 | 0.90 | 3.58 | 0.20 | 1.08 | 138.2 |
| 19 | 0.87 | 0.92 | 1.62 | 3.00 | 3.51 | | 1.88 | 107.55 |
| 20 | 0.85 | 0.62 | 1.45 | 4.95 | 3.55 | | | 148.75 |
| 21 | 1.29 | 0.80 | 1.45 | 4.54 | 3.70 | | | 5.2 |
| 22 | 0.92 | 0.75 | 2.04 | 4.51 | 3.67 | | | 111.25 |
| 23 | 1.20 | 0.59 | 3.45 | 4.53 | 3.65 | | | −43.85 |
| 24 | 0.90 | 0.61 | 3.47 | 4.64 | 3.41 | | | 54.55 |
| 25 | 0.89 | 0.70 | 3.47 | 4.21 | 4.05 | | | 76.25 |
| 26 | 0.92 | 0.55 | 1.36 | 4.40 | 3.29 | | | 134.95 |

TABLE 2

| | Ms temperature (°C.) | | | Mf temperature (°C.) | | |
|---|---|---|---|---|---|---|
| No. | 1st layer | 2nd layer | 3rd layer | 1st layer | 2nd layer | 3rd layer |
| 1 | −16 | 71 | 93 | −246 | −159 | −137 |
| 2 | 93 | 208 | 236 | −137 | −22 | 6 |
| 3 | −75 | −3 | 16 | −305 | −233 | −214 |
| 4 | −106 | −41 | −25 | −336 | −271 | −255 |
| 5 | 10 | 105 | 128 | −220 | −125 | −102 |
| 6 | 4 | 91 | 114 | −226 | −139 | −116 |
| 7 | −33 | 50 | 71 | −263 | −180 | −159 |
| 8 | −11 | 78 | 100 | −241 | −152 | −130 |
| 9 | 34 | 134 | 159 | −196 | −96 | −71 |
| 10 | 33 | 133 | 158 | −197 | −97 | −72 |
| 11 | 13 | 107 | 131 | −217 | −123 | −99 |
| 12 | 36 | 137 | 162 | −194 | −93 | −68 |
| 13 | −72 | 1 | 20 | −302 | −229 | −210 |
| 14 | −111 | −48 | −32 | −341 | −278 | −262 |
| 15 | 139 | 266 | 297 | −91 | 36 | 67 |
| 16 | −13 | 75 | 97 | −243 | −155 | −133 |
| 17 | −15 | 73 | 95 | −245 | −157 | −135 |
| 18 | 12 | 107 | 130 | −218 | −123 | −100 |
| 19 | −11 | 78 | 100 | −240 | −152 | −130 |
| 20 | 20 | 117 | 141 | −210 | −113 | −89 |
| 21 | −88 | −18 | −6 | −318 | −248 | −236 |
| 22 | −8 | 81 | 104 | −238 | −149 | −126 |
| 23 | −124 | −64 | −49 | −354 | −294 | −279 |
| 24 | −51 | 28 | 48 | −281 | −202 | −182 |
| 25 | −34 | 49 | 69 | −264 | −181 | −161 |
| 26 | 10 | 104 | 127 | −220 | −126 | −103 |

TABLE 3

| | | | | Hardness (HRC) | | | |
|---|---|---|---|---|---|---|---|
| No. | Workability | Cracks | Ease of machining | as welded | after supercooling | Abrasion wear (mg/cm$^3$) | Evaluation |
| 1 | ○ | ○ | ○ | 40 | 44 | 289.1 | X |
| 2 | ○ | ○ | X | 57 | 63 | 100.5 | X |
| 3 | ○ | ○ | X | 30.5 | 45.5 | 331.1 | X |
| 4 | ○ | Δ | ○ | 23 | 33 | 382.1 | X |
| 5 | ○ | ○ | ○ | 41 | 57.5 | 72.1 | ○ |
| 6 | X | X | ○ | 44 | 60 | 89.2 | X |
| 7 | ○ | ○ | ○ | 38 | 53 | 71.2 | ○ |
| 8 | X | X | ○ | 40 | 57 | 98.2 | X |
| 9 | ○ | ○ | X | 57 | 63.5 | 88.1 | X |
| 10 | X | ○ | X | 57 | 60 | 90.2 | X |
| 11 | ○ | ○ | ○ | 45 | 59.5 | 79.9 | ○ |
| 12 | ○ | ○ | X | 58 | 59 | 81.1 | X |
| 13 | ○ | X | ○ | 31 | 44 | 265.2 | X |
| 14 | ○ | ○ | ○ | 29 | 45 | 235.4 | X |
| 15 | ○ | X | X | 61 | 65 | 81.1 | X |

TABLE 3-continued

| No. | Work-ability | Cracks | Ease of machining | Hardness (HRC) as welded | after super-cooling | Abrasion wear (mg/cm³) | Evaluation |
|---|---|---|---|---|---|---|---|
| 16 | ○ | X | ○ | 40 | 44 | 305.5 | X |
| 17 | ○ | ○ | X | 47 | 65.5 | 79.5 | X |
| 18 | ○ | ○ | ○ | 42 | 58 | 82.0 | ○ |
| 19 | ○ | ○ | ○ | 41 | 57 | 83.1 | ○ |
| 20 | ○ | ○ | ○ | 43 | 59 (57) | 79.0 (101.4) | |
| 21 | ○ | ○ | ○ | 31 | 61 (47) | 77.2 (150.9) | |
| 22 | ○ | ○ | ○ | 41 | 59 (57) | 82.1 (105.0) | ○ |
| 23 | ○ | △ | ○ | 28 | 63 (43) | 75.2 (157.3) | ○ |
| 24 | ○ | ○ | ○ | 36 | 58 (48) | 80.4 (153.1) | ○ |
| 25 | ○ | ○ | ○ | 40 | 59 (52) | 79.9 (132.0) | ○ |
| 26 | ○ | ○ | ○ | 42 | 58 (56) | 82.1 (95.6) | ○ |

TABLE 4

| No. | Composition (% by weight) | | | | | | | Cal'd Ms temp. (°C.) |
|---|---|---|---|---|---|---|---|---|
| | C | Si | Mn | Cr | Co | Mo | V | |
| 27 | 0.92 | 1.18 | 1.26 | 4.95 | 3.41 | | | 129.75 |
| 28 | 0.93 | 1.22 | 1.29 | 4.93 | 3.49 | | | 126.65 |

TABLE 5

| No. | Ms temperature (°C.) | | | Mf temperature (°C.) | | |
|---|---|---|---|---|---|---|
| | 1st layer | 2nd layer | 3rd layer | 1st layer | 2nd layer | 3rd layer |
| 27 | 6 | 99 | 122 | −224 | −131 | −108 |
| 28 | 4 | 96 | 119 | −227 | −134 | −111 |

TABLE 6

| No. | Work-ability | Cracks | Ease of machining | Hardness (HRC) as welded | after super-cooling | Abrasion wear (mg/cm³) | Evaluation |
|---|---|---|---|---|---|---|---|
| 27 | ○ | ○ | ○ | 40 | 57 | 73.8 | ○ |
| 28 | ○ | ○ | ○ | 39.5 | 57.5 | 72.9 | ○ |

TABLE 7

| | Thrust force | Feed force | Normal force | Bending force |
|---|---|---|---|---|
| Present Invention | 124 Kgf | 114 Kgf | 73 Kgf | 168 Kgf |
| Conventional method | 192 Kgf | 108 Kgf | 89 Kgf | 220 Kgf |
| Ratio | 0.64 | 1.06 | 0.82 | 0.76 |

What is claimed is:

1. A method of manufacturing a metallic press die having an edge portion or high pressure portion for processing a workpiece therewith, said method comprising the steps of:

overlaying a welding material to that portion of a base material for said metallic press die which forms said edge portion or high pressure portion, said welding material having a hardness after welding of HRC 45 or below;

machining an overlaid portion formed by the preceding step into a predetermined shape of said edge portion or high pressure portion; and subjecting, after said machining step, said overlaid portion to a sub-zero treatment in the absence of a previous quenching step to increase a hardness of said overlaid portion.

2. A method of manufacturing a metallic press die having an edge portion or high pressure portion for processing a workpiece therewith, said method comprising the steps of:

overlaying a welding material to that portion of a base material for said metallic press die which forms said edge portion or high pressure portion, said welding material having a hardness after welding of HRC 45 or below;

machining an overlaid portion formed by the preceding step into a predetermined shape of said edge portion or high pressure portion; and subjecting after said machining step, said overlaid portion to a sub-zero treatment in the absence of a previous quenching step to increase a hardness of said overlaid portion, wherein said welding material contains, as a basic composition thereof, 0.5–1.5% by weight of carbon (C), 0.2–2.0% by weight of silicon (Si), 0.3–6.0% by weight of manganese (Mn), 0.3–10.0% by weight of chromium (Cr), 0.3–10.0% by weight of cobalt (Co), and the remaining parts of iron (Fe) inclusive of unavoidable impurities, and wherein a starting temperature of martensitic transformation is 150° C. or below.

3. A method of manufacturing a metallic press die according to claim 2, wherein said welding material contains aside from said basic composition, one or more of vanadium (V), nickel (N), molybdenum (Mo), tungsten (W), aluminum (Al) and copper (Cu).

* * * * *